UNITED STATES PATENT OFFICE.

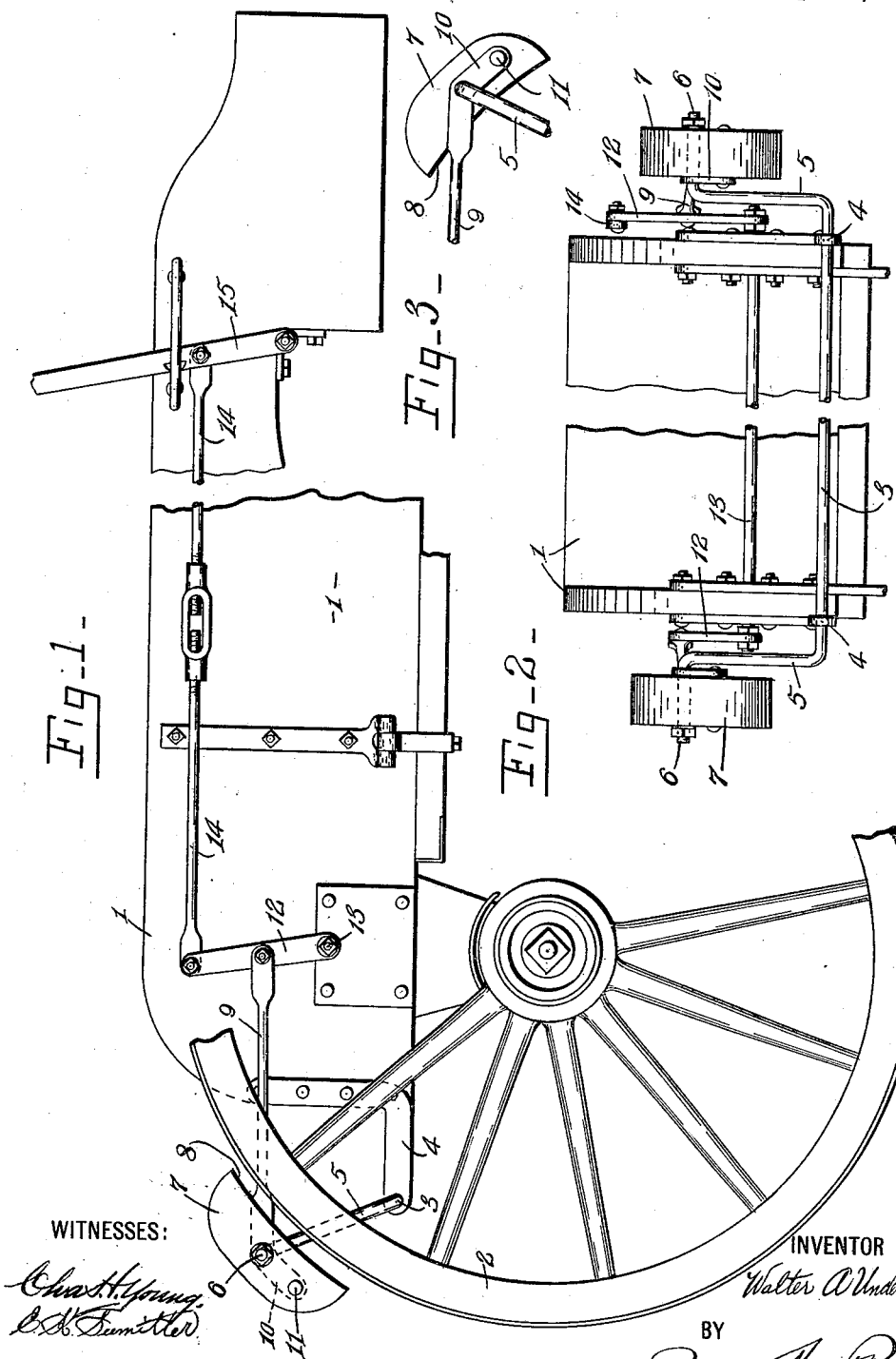

WALTER A. UNDERHILL, OF AUBURN, NEW YORK, ASSIGNOR TO THE EAGLE WAGON WORKS, OF AUBURN, NEW YORK, A CORPORATION OF NEW YORK.

BRAKE FOR WAGONS.

1,136,851.     Specification of Letters Patent.     Patented Apr. 20, 1915.

Application filed November 26, 1909. Serial No. 529,896.

*To all whom it may concern:*

Be it known that I, WALTER A. UNDERHILL, of Auburn, in the county of Cayuga and State of New York, have invented a certain new and useful Brake for Wagons, of which the following is a specification.

My invention has for its object the production of a simple and efficient brake, particularly applicable for dumping wagons; and it consists in the combinations and constructions hereinafter set forth and claimed.

In describing this invention, reference is had to the accompanying drawing, in which like characters designate corresponding parts in all the views.

Figure 1 is an elevation, partly broken away, of a dumping wagon embodying my invention. Fig. 2 is a rear elevation thereof, parts being omitted. Fig. 3 is a detail view of one of the brake blocks and contiguous parts.

This brake comprises generally, a block provided with a concave engaging face for coacting with the periphery or tread of the wagon wheel, such face being normally substantially concentric with said periphery, and means for moving the block toward and from the periphery of the wagon wheel in a substantially tangential direction and holding the block during the movement thereof with its engaging face substantially concentric with said periphery.

My invention is here shown embodied in a dumping wagon provided with brake blocks located on opposite sides of the body of the wagon for engaging the peripheries or treads of the rear wheels, both blocks being operated by suitable means located on but one side of the wagon body.

1 is the body of the wagon; and 2 is one of the rear wheels, the other rear wheel and the front wheels being omitted.

3 is a rock shaft extending crosswise of the rear end of the wagon body and being here shown as journaled in rearwardly extending brackets 4 provided on the body 1, the rock shaft being arranged so that its axis is located in a line extending transversely of the wheel and within the same.

5 are rock arms carried at opposite ends of the rock shaft and extending upwardly and rearwardly and provided with spindles, stubs or pivots 6 at their free ends; and 7 are brake blocks mounted on the spindles 6, each block having a concave engaging face 8 for coacting with the periphery of the adjacent rear wheel 2. The arms 5 are preferably formed integral with the shaft 3 and extend upwardly and rearwardly from said shaft as seen in Fig. 1. Owing to the arrangement of the rock arms, the brake shoes are arranged to engage the peripheries of the wheels above the horizontal plane intersecting the axle of the wheels, and in the rear of the vertical plane containing such axis.

The means for actuating each brake block and for holding said block with its engaging face 8 substantially concentric with the periphery of the adjacent wheel 2 during the movement of the brake block into and out of operative position includes a link 9 having its rear end connected to the spindle 6 for the brake block and having an extension or arm 10 which is fixed at 11 to the brake block. Thus during the movement of said links 9 the brake blocks are prevented from tilting on the spindles 6 and are controlled in their movement by the links 9 so that during the movement of the blocks the links hold the blocks with their engaging faces 8 substantially concentric with the peripheries of the wheels 2 and but slight movement or small leverage is necessary to carry the brake blocks away from the wheels. The links 9 are connected at their front ends to arms 12 mounted on opposite ends of a rock shaft 13 journaled in the wagon body 1 in front of the rock shaft 3, the rock arm 12 on one side of the body being connected by a link 14 to a hand lever 15 located at the front of the wagon.

What I claim is:—

1. The combination with a vehicle, of a brake shoe arranged to engage the periphery of a wheel, a rock arm pivotally mounted at one end on the vehicle body and the axis thereof being located in a line extending transversely of the wheel within the same, the shoe being mounted on the outer end of the arm, and the arm being arranged to carry the shoe in a tangential direction toward the periphery of the wheel, and means for actuating the arm and holding the shoe in parallelism to the periphery of the wheel during the movement of said arm to carry the shoe in a tangential direction, substantially as and for the purpose described.

2. The combination with a vehicle, of a brake shoe arranged to engage the periphery of a wheel, a rock arm pivotally mounted at one end on the vehicle body and the axis thereof being located in a line extending transversely of the wheel within the same, the shoe being mounted on the outer end of the arm, and the arm being arranged to carry the shoe in a tangential direction toward the periphery of the wheel, and means for actuating the arm, said means being connected to the shoe to hold the same in parallelism with the periphery of the wheel while moving the arm to carry the shoe in a tangential direction, substantially as and for the purpose specified.

3. The combination with a vehicle, of a brake shoe arranged to engage the periphery of the wheel, a rock arm pivotally mounted at one end on the vehicle body, the axis of said arm being arranged in a line extending transversely of the wheel within the same, and the arm having at its outer end a laterally extending stub on which the shoe is pivotally mounted, the arm being relatively arranged to the wheel to carry the shoe in a substantially tangential direction toward and from the periphery of the wheel, and means for operating the rock arm including a link having a bearing on the stub, the link being rigidly connected to the shoe to hold the same in parallelism with the periphery of the wheel during the movement of the shoe in a tangential direction, substantially as and for the purpose set forth.

4. The combination with a vehicle, of a brake shoe arranged to engage the periphery of the wheel above the horizontal plane intersecting the axis of the wheel and in the rear of the vertical plane intersecting said axis, a rock arm pivotally mounted at one end on the side of the vehicle body and extending upwardly and rearwardly, and pivotally connected at its upper end to the shoe, the arm being arranged to carry the shoe in a tangential direction toward and from the periphery of the wheel, and the axis of the arm being arranged in a line extending transversely of the wheel within the same, and above and in the rear of the axis of the wheel, and means for operating the shoe comprising means connected thereto to hold the same in parallelism with the periphery of the wheel during the movement of the shoe by the arm in a tangential direction, substantially as and for the purpose described.

In testimony whereof, I have hereunto signed my name in the presence of two attesting witnesses, at Auburn, in the county of Cayuga, in the State of New York, this 22nd day of November, 1909.

WALTER A. UNDERHILL.

Witnesses:
 HERBERT PRICE,
 WALTER PRICE.

Copies of this patent may be obtained for five cents each, by addressing the "Commissioner of Patents. Washington, D. C."